United States Patent
Wrigley

(10) Patent No.: US 11,693,166 B2
(45) Date of Patent: Jul. 4, 2023

(54) SEPTUMLESS OMT POLARIZER

(71) Applicant: LOCKHEED MARTIN CORPORATION, Bethesda, MD (US)

(72) Inventor: Jason Stewart Wrigley, Littleton, CO (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 257 days.

(21) Appl. No.: 16/989,789

(22) Filed: Aug. 10, 2020

(65) Prior Publication Data
US 2022/0043197 A1    Feb. 10, 2022

(51) Int. Cl.
| | |
|---|---|
| G02B 5/30 | (2006.01) |
| G02F 1/1333 | (2006.01) |
| H01P 1/161 | (2006.01) |
| G02F 1/1335 | (2006.01) |

(52) U.S. Cl.
CPC ....... *G02B 5/3025* (2013.01); *G02F 1/13338* (2013.01); *H01P 1/161* (2013.01); *G02F 1/133541* (2021.01)

(58) Field of Classification Search
CPC .............. G02B 5/3025; G02F 1/13338; G02F 1/133541; H01P 1/161
See application file for complete search history.

(56) References Cited

U.S. PATENT DOCUMENTS

| | | | | |
|---|---|---|---|---|
| 6,118,412 A | * | 9/2000 | Chen | H01Q 13/06 343/756 |
| 2008/0186113 A1 | * | 8/2008 | Hoover | H01P 5/082 333/249 |
| 2009/0302971 A1 | * | 12/2009 | Rosenberg | H01P 1/161 333/137 |
| 2010/0141543 A1 | * | 6/2010 | Parekh | H01P 1/161 333/135 |
| 2011/0043422 A1 | * | 2/2011 | Lin | H01Q 13/0241 343/756 |

FOREIGN PATENT DOCUMENTS

| | | | | | |
|---|---|---|---|---|---|
| CN | 106025451 B | * | 2/2019 | ............... | H01P 1/17 |
| KR | 1228014 B1 | * | 2/2013 | ............... | H01P 1/16 |

* cited by examiner

*Primary Examiner* — Hafizur Rahman
*Assistant Examiner* — Kimberly E Glenn
(74) *Attorney, Agent, or Firm* — BakerHostetler

(57) ABSTRACT

A septumless polarizer is an OMT polarizer which is formed without a traditional thin septum which bridges the gap from the first assembly half to the second assembly half when the polarizer is split in the zero-current region of the rectangular waveguides (RHCP and LHCP ports). The septumless polarizer utilizes a dual-axis-stepped feature, which is included in one half of the polarizer only, creates the illusion of a traditional thin septum and actually improves performance. A close-proximity fastener scheme is enabled along with a fully encompassing pressure lip and contact pressure risks are mitigated.

18 Claims, 6 Drawing Sheets

SEPTUMLESS OMT POLARIZER

STATEMENT REGARDING FEDERALLY SPONSORED RESEARCH OR DEVELOPMENT

Not applicable.

FIELD OF THE INVENTION

The present invention generally relates to waveguide communications systems and, more particularly, to a septumless orthomode transducer (OMT) polarizer.

BACKGROUND

An orthomode transducer (OMT) polarizer is a three-port waveguide component that can be used to separate horizontally and vertically polarized signals from a circular-polarized signal or, vice versa, i.e., combine horizontally and vertically polarized signals in to a circularly or elliptically polarized signal. When a circularly polarized signal is applied to the input port of an OMT, the linear orthogonal components are separated from the signal to provide the horizontally polarized part of the wave at a first port and the vertically polarized part of the signal at a second port of the OMT.

Traditional septum OMT polarizer solutions contains a thin septum which is typically fabricated via a plunge or wire electro-discharge machining (EDM) operation, which increases production cost versus conventional direct machining. Alternatively, a copper insert may be implemented, and the unit can be electroformed. The thin septum in the traditional OMT polarizer prevents splitting the feed in a plane perpendicular to the septum which would unlock the possibility for a two-part feed-network assembly that would benefit from a reduction in manufacturing cost. Additionally, a split plane perpendicular to the septum, and through the zero-current regions of the rectangular waveguides, would permit integration of reject filters and diplexers while still forming a feed assembly composed of only two parts.

SUMMARY

According to various aspects of the subject technology, methods and configurations are disclosed for providing a septumless orthomode transducer (OMT) polarizer. The disclosed solution removes the entire septum feature from one-half of the polarizer assembly while actually improving nominal performance and mitigating the contact pressure risks.

In one or more aspects, a monolithic septumless polarizer includes a first half-structure including a first cavity and a second half-structure including a second cavity matching the first cavity for coupling to the first half-structure to form the monolithic septumless polarizer. The monolithic septumless polarizer includes an antenna port, a right-hand circularly polarized (RHCP) port and a left-hand circularly polarized (LHCP) port. The second half-structure includes a stepped structure having reduced dimensions toward the antenna port. The stepped structure separates RHCP and LHCP waves and guides the separated RHCP and LHCP waves to the RHCP port and the LHCP port, respectively.

In other aspects, a monolithic septumless polarizer array includes multiple septumless polarizers. Each septumless polarizer includes a first half-structure having a first cavity and a second half-structure having a second cavity matching the first cavity, for coupling to the first half-structure to form a septumless polarizer. The septumless polarizer includes an antenna port, an RHCP port and an LHCP port. The second half-structure includes a stepped structure to guide the separated RHCP and LHCP waves to the RHCP port and the LHCP port, respectively, and dimensions of the stepped structure is reduced toward the antenna port.

In yet other aspects, a method of providing a septumless polarizer includes fabricating a first half-structure including a first cavity. The method further includes fabricating a second half-structure including a second cavity matching the first cavity. The first half-structure is coupled to the second half-structure to form the septumless polarizer. The septumless polarizer includes an antenna port, an RHCP port and an LHCP port. The second half-structure includes a stepped structure, having reduced dimensions toward the antenna port, to separate RHCP and LHCP waves and to guide the separated RHCP and LHCP waves to the RHCP port and the LHCP port, respectively.

The foregoing has outlined rather broadly the features of the present disclosure so that the following detailed description can be better understood. Additional features and advantages of the disclosure, which form the subject of the claims, will be described hereinafter.

BRIEF DESCRIPTION OF THE DRAWINGS

For a more complete understanding of the present disclosure and the advantages thereof, reference is now made to the following descriptions to be taken in conjunction with the accompanying drawings describing specific aspects of the disclosure, wherein.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block-diagram form in order to avoid obscuring the concepts of the subject technology.

In some aspects of the present technology, methods and configurations are disclosed for providing a septumless orthomode transducer (OMT) polarizer. The disclosed solution removes the entire septum feature from one-half of the polarizer assembly while actually improving bandwidth and performance. Additionally, the OMT polarizer of the subject technology includes a fully encompassing pressure lip to mitigate contact pressure risk. The disclosed solution allows for routing the rectangular ports in any direction and provides ample room for fasteners for securing or joining the two pieces of the waveguide. Further, the geometry of the subject OMT polarizer is designed to be direct machined on a single axis rather than using the plunge electric discharge machining (EDM). Avoiding the use of the EDM can greatly reduce cost, diversify the manufacturer vendor pool and reduce manufacturing lead times.

Figure 1:
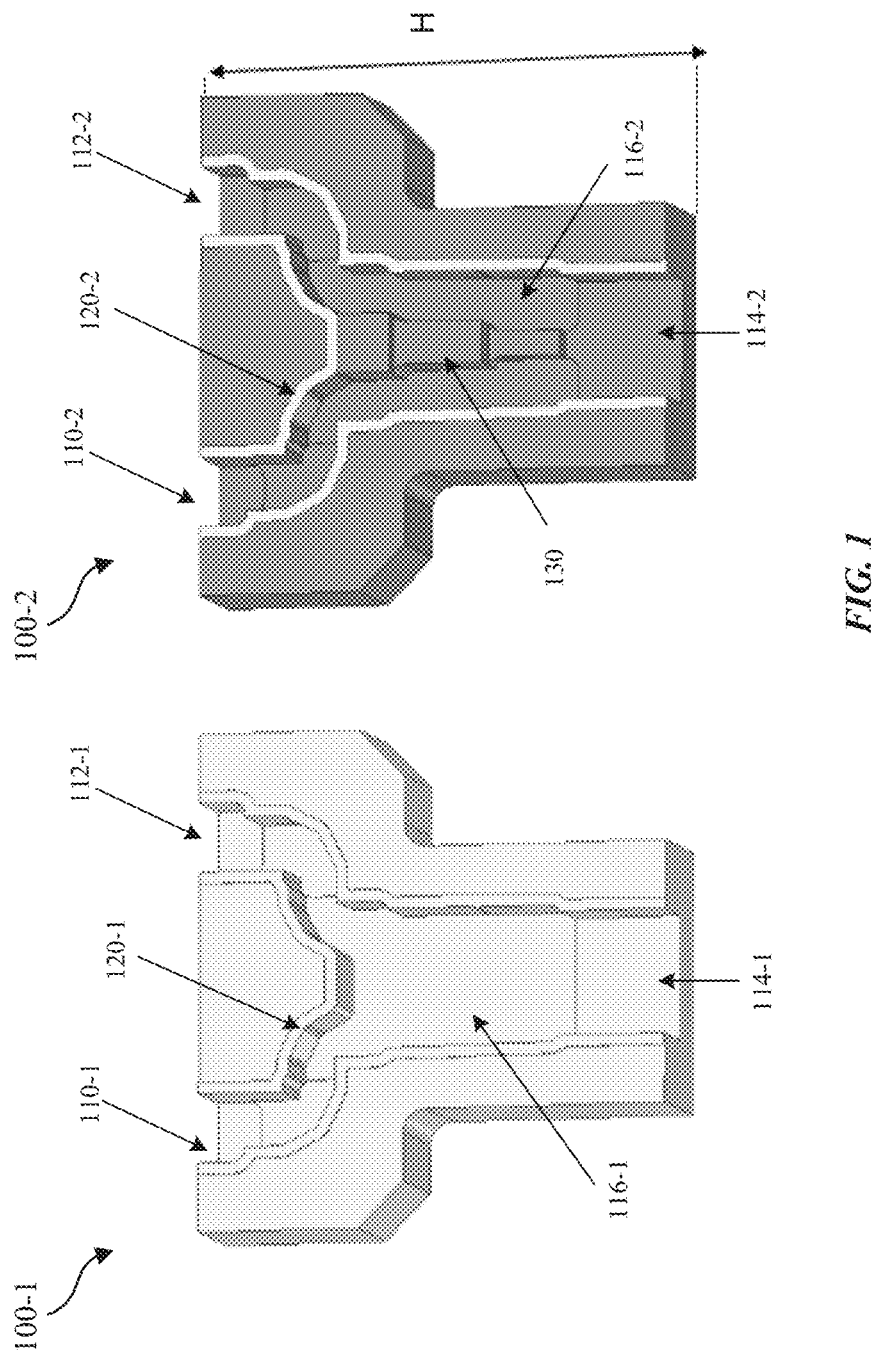
FIG. 1 is a schematic diagram illustrating cross-sectional views of an example of a septumless orthomode transducer (OMT) polarizer, according to certain aspects of the disclosure.

FIG. 1 is a schematic diagram illustrating cross-sectional views of an example of a septumless OMT polarizer, according to certain aspects of the disclosure. The cross-sectional views shown in FIG. 1 depict first half-structure 100-1 and second half-structures 100-2 of the septumless OMT polarizer of the subject technology, which is a dual-circularly polarized. The first half-structure 100-1 includes first halves 110-1, 112-1 and 114-1 of the structures of a left-hand circularly polarized (LHCP) port, a right-hand circularly polarized (RHCP) port and an antenna port, respectively. The second half-structure 100-2 includes second halves 110-2, 112-2 and 114-2 of the structures of the LHCP port, the RHCP port and the antenna port, respectively. The first half-structure 100-1 does not have any septum and includes a raised pressure-lip feature 120-1 all around the waveguides of the first half-structure 100-1.

The second half-structure 100-2 includes an additional feature, namely, a dual-axis stepped floor feature 130, which is a structure with smaller dimensions toward the second-half 114-2 of the antenna. The dual-axis-stepped floor feature 130 can separate the LHCP and RHCP portions of the antenna electro-magnetic (EM) waves and effectively function as the septum of the traditional OMT polarizers. On the second half-structure 100-2 is shown a flat pressure-lip mating area 120-2 all around the waveguides of the second half-structure 100-2. The flat pressure-lip mating area 120-2 matches the raised pressure-lip feature 120-1 and indicates the location of pairing the second half-structure 100-2 to the first half-structure 100-1. Replacing the septum of the traditional OMT polarizers with the dual-axis floor feature 130 allows separate fabrication of the two halves of the antenna feed structure and the application of an adhesive with pressure to join the two halves, which would benefit both manufacturing cost and schedule. Alternatively, an adhesive can be avoided, and sufficient contact pressure can be achieved via a scheme of fasteners. In some aspects, the flat pressure-lip mating area 120-2 may be replaced with a recess or capture channel that can help with alignment and can be filled with the adhesive before pairing the second half-structure 100-2 to the first half-structure 100-1.

In some aspects, the septumless OMT polarizer of the subject technology can be made of aluminum (Al) and be silver plated, although other materials such as brass and invar can also be used. At an operating 30-GHz frequency band, an example value of the height H of the septumless OMT polarizer of the subject technology can be about one inch.

Figure 2:
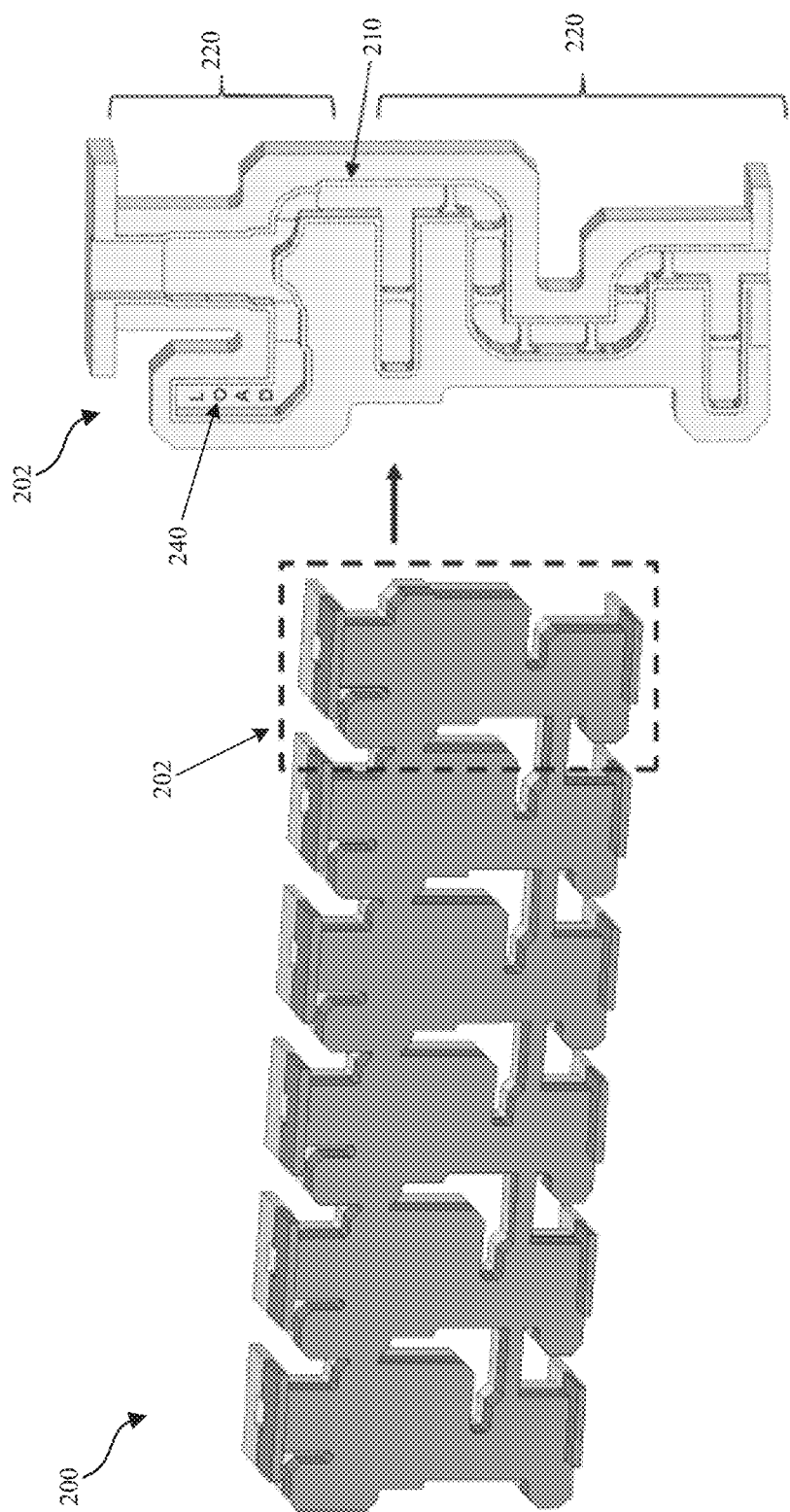
FIG. 2 is a schematic diagram illustrating perspective and cross-sectional views of an example of a single polarization septumless polarizer which contains an integrated Tx or Rx reject filter, according to certain aspects of the subject technology.

FIG. 2 is a schematic diagram illustrating a perspective view and a cross-sectional view of an example of a monolithic antenna feed array 200, according to certain aspects of the disclosure. The perspective view shown in FIG. 2 depicts the monolithic antenna feed array 200 formed of multiple (e.g., six) feed elements 202. The cross-sectional view shows only a half-structure of a single feed element 202 of the monolithic antenna feed array 200. The half-structure of a single feed element 202 includes a septumless OMT polarizer 220 fully integrated with a reject-filter waveguide 230. A single-pole port (e.g., LHCP port) of the septumless OMT polarizer 220 is integrated with a load waveguide 240. Also shown in the cross-sectional view are pressure-lip features 210 along the edges of the cavity of the feed element 202. The monolithic antenna feed array 200 can be built (machined) as two separate half-structures, each including multiple half-structures similar to the half-structure of the feed element 202, which are made as a single piece in a one-step manufacturing process. The two single pieces are joined together by using an adhesive and applying suitable pressure to form the monolithic antenna feed array 200. In other words, by running the split plane through the reject filter, load channel and also neighboring polarizers, the subject technology forms multiple feed networks composed of just two direct machined parts. Alternatively, a fastener scheme alone can be used to generate the necessary contact pressure and an adhesive may be avoided.

Figure 3:
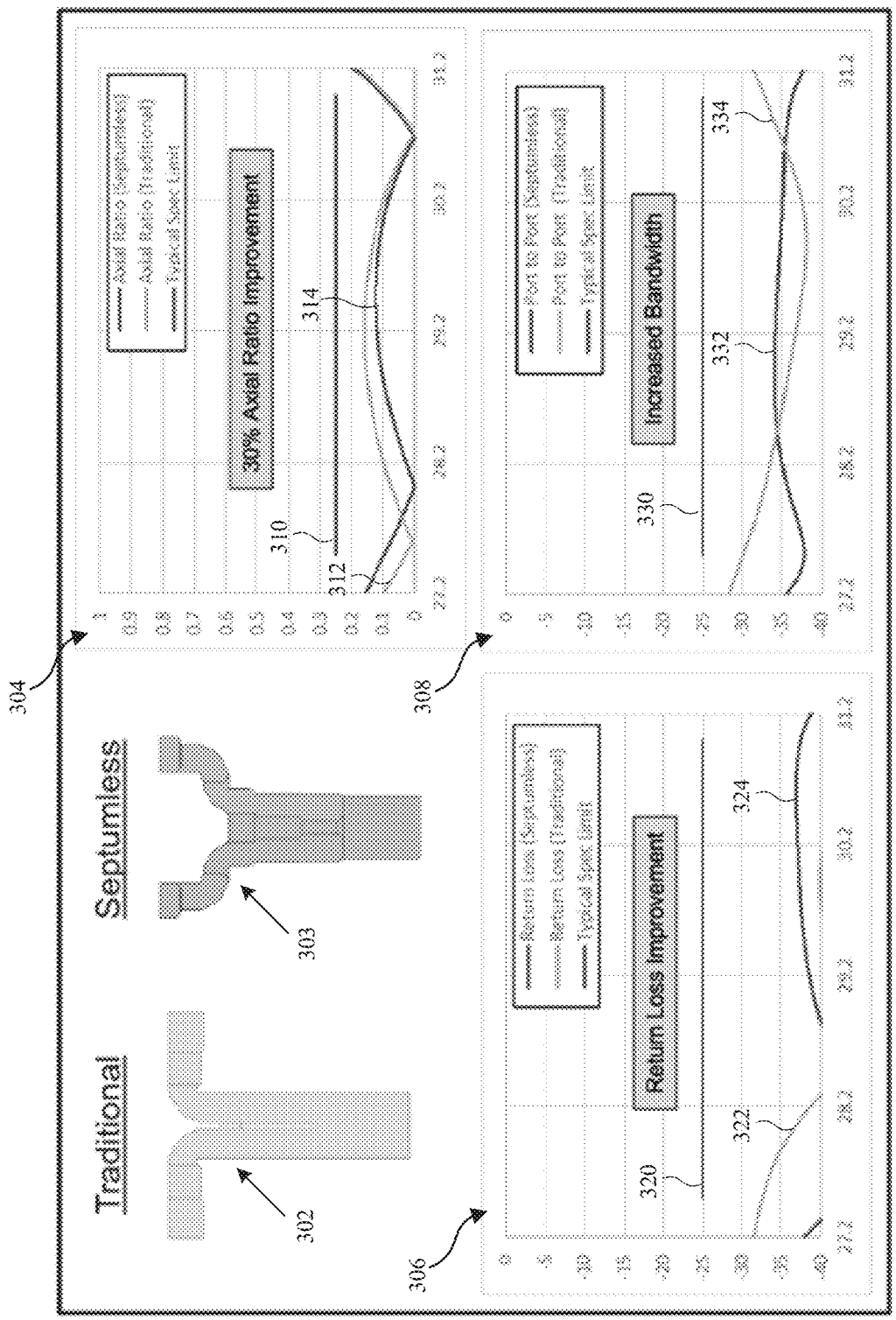
FIG. 3 is a diagram illustrating charts depicting axial ratio, return loss and port-to-port isolation associated with an example septumless OMT polarizer, according to certain aspects of the disclosure.

FIG. 3 is a diagram illustrating charts 304, 306 and 308 depicting axial ratio, return loss and port-to-port isolation associated with an example septumless OMT polarizer 303, according to certain aspects of the disclosure. There are two OMT polarizers shown in FIG. 3, a traditional OMT polarizer 302 and a septumless OMT polarizer 303, for which some characteristics are illustrated in the plots of the charts 304, 306 and 308. The chart 304 shows a plot 310, which depicts a specification limit for an axial ratio of a typical OMT polarizer, and plots 312 and 314, which depict the variation of axial ratio versus frequency (GHz) for the traditional OMT polarizer 302 and the septumless OMT polarizer 303, respectively. The septumless OMT polarizer 303 of the subject technology is indicated to have about 30% improvement in axial ratio compared to the traditional OMT polarizer 302. It should be noted that at frequencies above 30 GHz a tuner above the floor-feature steps may be incorporated to achieve optimal axial ratio due to compression of the lid.

The chart 306 shows a plot 320, which depicts a specification limit for a return loss of a typical OMT polarizer, and plots 322 and 324, which depict variation of return loss versus frequency (GHz) for the traditional OMT polarizer 302 and the septumless OMT polarizer 303, respectively. The septumless OMT polarizer 303 of the subject technology is indicated to have a noticeable improvement in return loss compared to the traditional OMT polarizer 302.

The chart 308 shows a plot 330, which depicts a specification limit for port-to-port isolation of a typical OMT polarizer, and plots 332 and 334, which depict the variation of the port to port versus frequency (GHz) for the traditional OMT polarizer 302 and the septumless OMT polarizer 303, respectively. The septumless OMT polarizer 303 of the subject technology is indicated to have an improved bandwidth compared to the traditional OMT polarizer 302.

Figure 4:
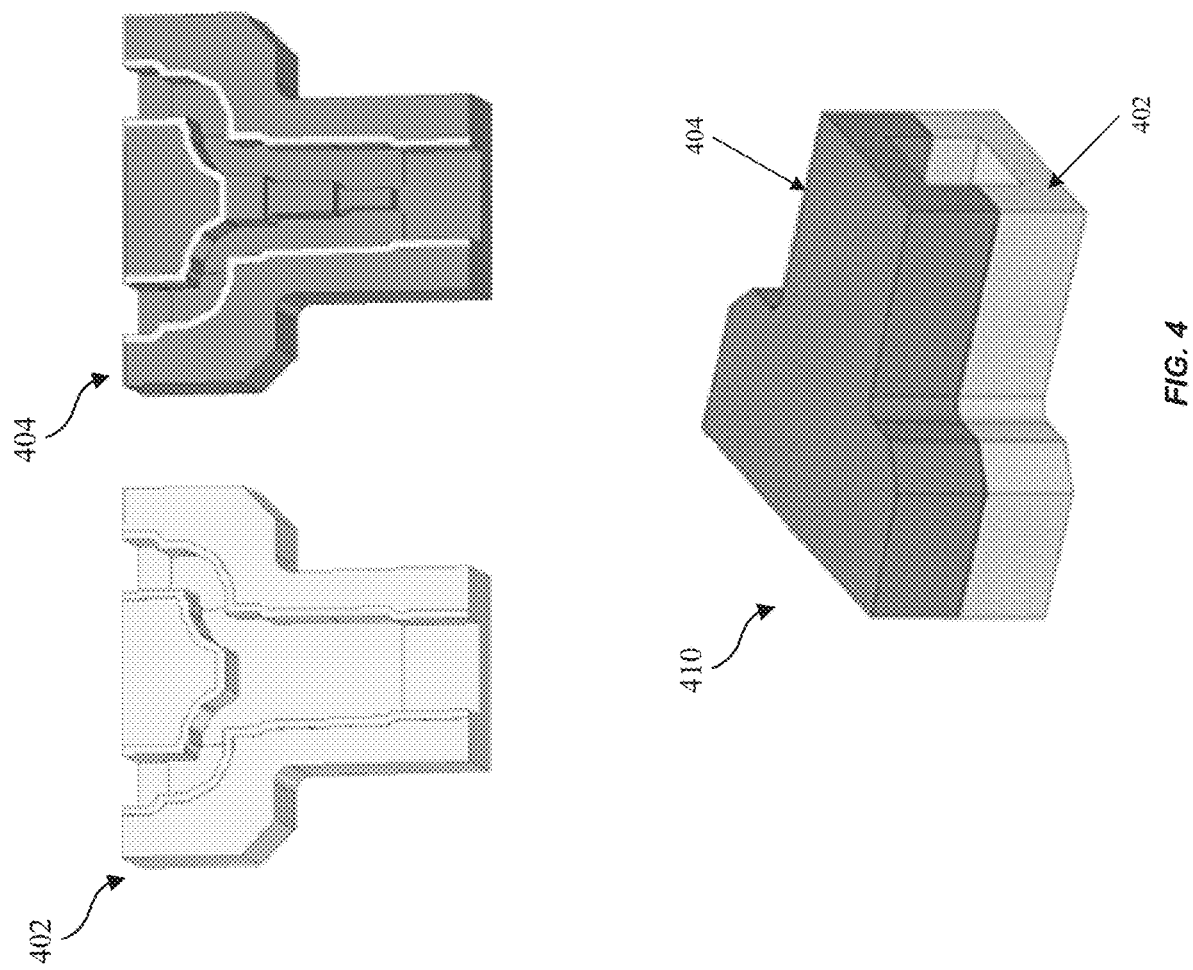
FIG. 4 is a schematic diagram illustrating cross-sectional and perspective views of an example of a septumless OMT polarizer, according to certain aspects of the disclosure.

FIG. 4 is a schematic diagram illustrating cross-sectional views 402 and 404 and a perspective view 410 of an example of a septumless OMT polarizer, according to certain aspects of the disclosure. The cross-sectional view 402 shows features similar to the first half-structure 100-1 of FIG. 1, and the cross-sectional view 404 depicts features similar to the second half-structure 100-2 of FIG. 1. The first and second half-structures are fabricated separately, in a single-step process, for example, using silver plated Al. The perspective view 410 shows the monolithic septumless OMT polarizer of the subject technology formed by joining the first and the second half-structures 402 and 404 using an adhesive substance and applying a suitable pressure. Alternatively, a fastener scheme may be used to generate the necessary contact pressure in the absence of any adhesive.

Figure 5:
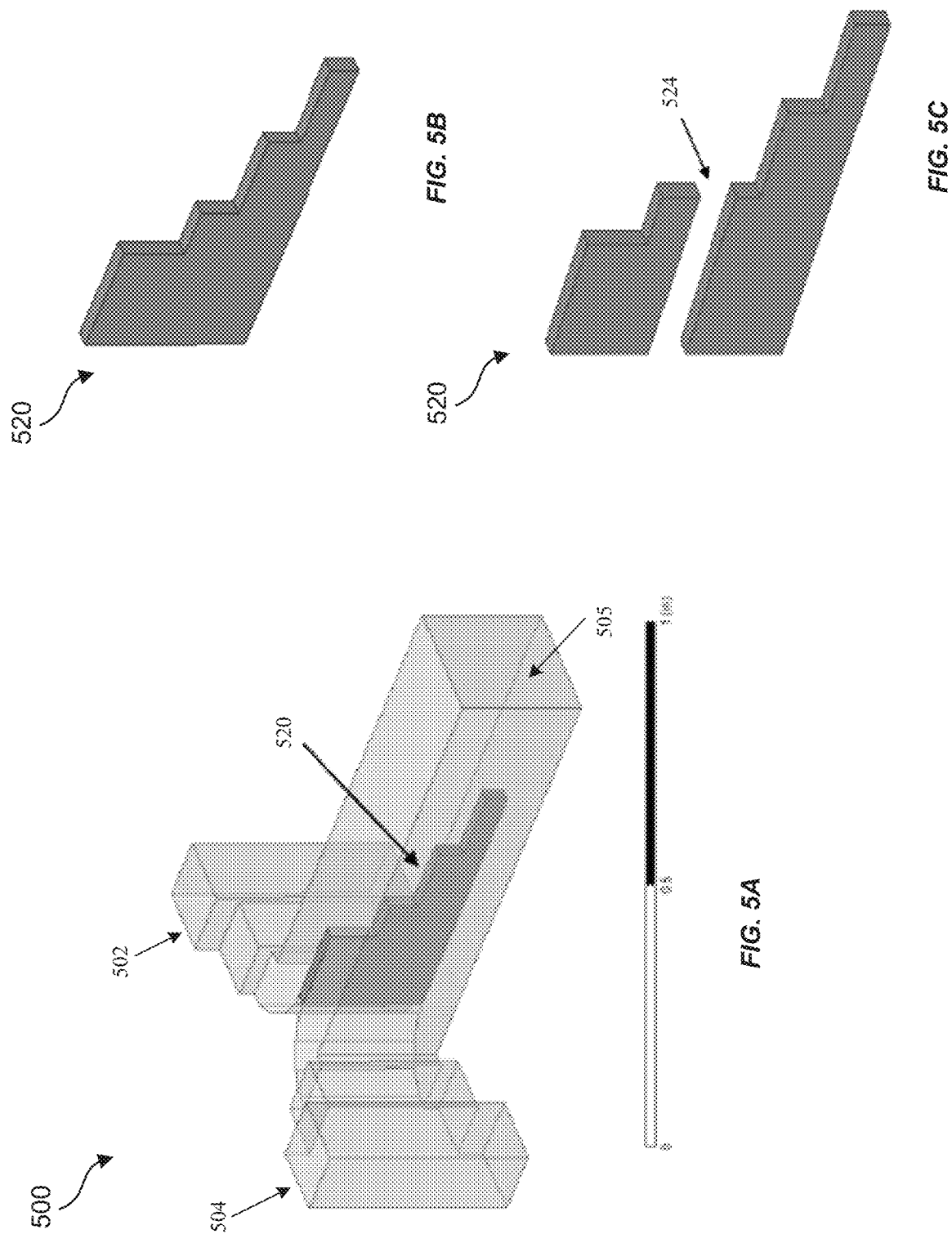
FIGS. 5A, 5B and 5C are schematic diagrams illustrating an example of a traditional OMT polarizer with septum.

FIGS. 5A, 5B and 5C are schematic diagrams illustrating an example of a traditional OMT polarizer 500 with septum. The traditional OMT polarizer 500 of FIG. 5A includes an RHCP port 502, an LHCP port 504, an antenna port 506 and a septum 520. The septum 520, as illustrated in FIG. 5B, is a thin septum having a stepwise structure and is used to separate LHCP waves from RHCP waves. The stepwise structure of the septum 520 with a number of undercuts is not suitable for splitting the OMT polarizer 500 into two half-structures as is possible with respect to the structure of the septumless OMT polarizer of the subject technology. This is because splitting of the septum 520, as indicated in FIG. 5C, would produce two dissimilar parts and the small thickness of the septum 520 would not allow withstanding the required pressure to join the two half-structures.

Figure 6:
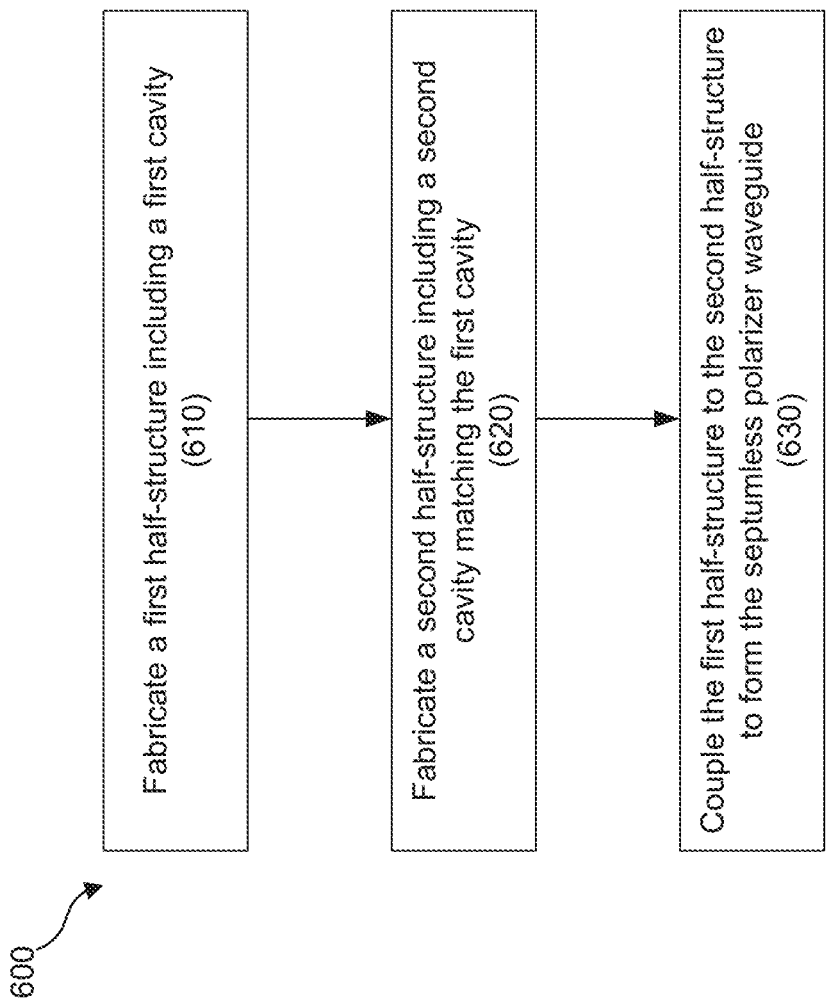
FIG. 6 is a flow diagram illustrating a method of providing a septumless OMT polarizer, according to certain aspects of the disclosure.

FIG. 6 is a flow diagram illustrating a method 600 of providing a septumless OMT polarizer, according to certain aspects of the disclosure. The method 600 includes fabricating a first half-structure (e.g., 100-1 of FIG. 1) including a first cavity (e.g., 116-1 of FIG. 1) (610). The method further includes fabricating a second half-structure (e.g., 100-2 of FIG. 1) including a second cavity (e.g., 116-2 of FIG. 1) matching the first cavity (620). The first half-structure is coupled to the second half-structure to form the septumless polarizer (e.g., 410 of FIG. 4) (630). The septumless polarizer includes an antenna port (e.g., 114-1 of FIG. 1), an RHCP port (e.g., 110-1 of FIG. 1) and an LHCP port (e.g., 112-1 of FIG. 1). The second half-structure includes a stepped structure (e.g., 130 of FIG. 1), having reduced dimensions toward the antenna port, to separate RHCP and LHCP waves and to guide the separated RHCP and LHCP waves to the RHCP port and the LHCP port, respectively.

In some aspects, the subject technology is related to methods and configurations for providing a septumless OMT polarizer. In some other aspects, the subject technology may be used in various markets, including, for example, and without limitation, communication systems and remote-sensing markets.

Those of skill in the art would appreciate that the various illustrative blocks, modules, elements, components, methods, and algorithms described herein may be implemented as electronic hardware, computer software or a combination of both. To illustrate this interchangeability of hardware and software, various illustrative blocks, modules, elements, components, methods, and algorithms have been described above, generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks may be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single hardware and software product or packaged into multiple hardware and software products.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meanings unless otherwise explicitly and clearly defined by the patentee. If there is any conflict in the usage of a word or term in this specification and one or more patent or other documents that may be incorporated herein by reference, the definition that is consistent with this specification should be adopted.

What is claimed is:

1. A polarizer, comprising:
   a first half-structure including a first cavity; and
   a second half-structure including a second cavity matching the first cavity for coupling to the first half-structure to form a first port and a second port;

an antenna port defined by respective regions of the first half-structure and the second half-structure; and a pressure-lip feature configured to mitigate a contact pressure risk associated with joining the first half-structure and the second half-structure, wherein:

the second half-structure includes a stepped structure located only in the second cavity, the stepped structure having reduced dimensions toward the antenna port and configured to separate waves and to guide the separated waves in the first half-structure and the second half-structure to the first port and the second port, respectively.

2. The polarizer of claim 1, wherein the pressure-lip feature comprises a raised pressure lip extended along edges of the first cavity.

3. The polarizer of claim 1, wherein each of the first half-structure and the second half-structure are made of a first material including at least one of aluminum, brass or invar.

4. The polarizer of claim 1, wherein the first cavity and the second cavity are coated with a layer of a second material including silver.

5. The polarizer of claim 1, wherein the polarizer comprises an orthomode transducer (OMT) polarizer.

6. The polarizer of claim 5, wherein the first half-structure is coupled to the second half-structure using an adhesive layer.

7. The polarizer of claim 6, wherein each of the first port and the second port are rectangular ports.

8. The polarizer of claim 6, wherein a space between the first port and the second port provides ample room for implementing one or more fasteners to secure coupling of the first half-structure and the second half-structure.

9. A monolithic polarizer array, comprising:

a plurality of polarizers, wherein a polarizer of the plurality of polarizers comprises:
　a first half-structure having a first cavity; and
　a second half-structure, having a second cavity matching the first cavity, for coupling to the first half-structure to form a first port and a second port; and
　an antenna port defined by respective regions of the first half-structure and the second half-structure; and
　an adhesive layer that joins the first half-structure to the second half-structure, wherein:

the second half-structure comprises a stepped structure configured to guide waves separated in the first half-structure and the second half-structure to the first port and the second port, respectively, and dimensions of the stepped structure are reduced toward the antenna port, wherein first half-structures of the plurality of polarizers are fabricated as a first half-array piece and the second half-structure of the plurality of polarizers are fabricated as a second half-array piece.

10. The monolithic polarizer array of claim 9, wherein the first half-structure further comprises a pressure-lip feature configured to mitigate a contact pressure risk associated with joining the first half-structure and the second half-structure.

11. The monolithic polarizer array of claim 10, wherein the pressure-lip feature comprises a raised pressure lip extended along edges of the first cavity.

12. The monolithic polarizer array of claim 11, wherein each element of multiple elements is a monolithic piece integrating the polarizer with a load waveguide and a reject-filter waveguide.

13. The monolithic polarizer array of claim 9, wherein the stepped structure is located only in the second cavity.

14. A method for manufacturing a polarizer, the method comprising:

fabricating a first half-structure including a first cavity;

fabricating a second half-structure including a second cavity matching the first cavity; and coupling the first half-structure to the second half-structure to form a first port, a second port, and an antenna port, wherein:

the second half-structure includes a stepped structure located only in the second cavity, the stepped structure having reduced dimensions toward the antenna port and configured to separate waves and to guide the separated waves in the first half-structure and the second half-structure to the first port and the second port, respectively.

15. The method of claim 14, wherein the polarizer comprises an orthomode transducer (OMT) polarizer, and wherein the method further comprises fabricating the first half-structure including a pressure-lip feature to mitigate a contact pressure risk associated with coupling the first half-structure to the second half-structure.

16. The method of claim 15, wherein the pressure-lip feature comprises a raised pressure lip extended along edges of the first cavity.

17. The method of claim 14, wherein each of the first half-structure and the second half-structure are made of a first material including at least one of aluminum, brass or invar.

18. The method of claim 14, wherein the first cavity and the second cavity are coated with a layer of a second material including silver.

* * * * *